United States Patent Office 3,422,890
Patented Jan. 21, 1969

3,422,890
TREATMENT OF SUBSURFACE OIL-BEARING FORMATIONS WITH OIL-WETTING CATIONIC EMULSIONS
Henry C. H. Darley, Houston, Tex., assignor to Shell Oil Company, New York, N.Y., a corporation of Delaware
No Drawing. Filed Dec. 22, 1966, Ser. No. 603,722
U.S. Cl. 166—9
Int. Cl. E21b 43/20, 43/16
6 Claims

ABSTRACT OF THE DISCLOSURE

Prior to waterflooding a formation for recovery of oil therefrom, the formation is treated with an oil-in-water emulsion capable of oil-wetting the formation so as to prevent swelling and improve the formation's response to permeability to waterflooding.

---

The present invention relates to a process for improving the preferential permeability to water of subterranean earth formations. More particularly, the invention pertains to an improved process for recovering hydrocarbons from underground formations by treating such formations particularly around the borehole so as to increase the relative permeability of the formation to water and/or steam which is used as the flooding or driving fluid in the hydrocarbon recovery.

Although it is well known that water and/or steam are effective flooding or driving fluids used in the recovery of hydrocarbons from formations by primary, secondary or even tertiary recovery processes, such means present many problems particularly when the formation is water and/or steam sensitive as in the case of clayey formations. In such cases the water sensitive formations when in contact with water, particularly fresh water, tend to swell and disintegrate with resultant reduction in the permeability of the formation to subsequent water and/or flooding operation utilized in hydrocarbons, e.g., oil recovery processes.

Various means are employed to effect improved permeability of formations to water in order to increase water injectivity into formations in recovery of hydrocarbons by water and/or steam injection. In the case of water sensitive formations such as clayey formations, the emphasis is to use various means so as to prevent or reduce swelling of the formation, such as by treating said formations with aqueous solutions containing nitrogen base compounds as described in U.S. Patents 2,761,835 to 2,761,843 or by contacting the earth formations with oil or with aqueous solutions containing a variety of water-soluble anionic, cationic or non-ionic surfactants. These methods have been found to be essentially ineffective particularly when these so-called treated formations are subjected to fresh water flooding operations in recovery of oil.

It has now been discovered that preferential permeability to water flooding or water-steam flooding of subterranean earth formations can be effectively accomplished by oil-wetting said formations with an oil solution containing 0.2–5%, preferably 1–2%, of a preferentially oil-soluble surface-active material that is dispersed in an aqueous solution containing 0.1–10%, preferably 0.3–0.7%, of preferentially water-soluble cationic surface-active material or mixtures of water-soluble cationic and nonionic surface-active materials and from about 0% to about 10%, preferably from about 0.5% to about 5% by weight of an inert salt. Saline water should be used in forming emulsions of the present invention when clayey formations are encountered in order to help inhibit the earth formation clays from becoming dispersed while the emulsion is being injected into such formations. When no clay is present, e.g., where the emulsion is being injected to displace oil or change the oil wetness of a nonwater-sensitive earth formation, no salt is necessary. However, since finer emulsions are generally obtained when the water contains some salt, it is preferable that the aqueous phase contain from about 0.5 to 5% salt. Where water-sensitive clays are present, the aqueous phase should preferably contain more than about 1.5% salt. Generally the oil-wetting solution containing said surfactants comprises an oil-in-saline water emulsion in which the oil or dispersed phase comprises from 1% to 40%, preferably between 3 and 10%, of the emulsion and the balance of saline water (brine) which is the continuous phase of the emulsion. Oil-wetting of formations particularly clayey formations by the present, preferably oil-saline water (brine) emulsion, does not only cause the formations to exhibit a significant preferential permeability to water, but where water-sensitive clays are encountered in earth formations, treatment of said formations with emulsions as described prevents or causes a significant reduction in water-swelling and disintegration tendencies of the clay. In addition, the oil-coating emulsion of the present invention changes the characteristic of the grain surfaces of the formations towards an oil-wet condition. As the oil-coating emulsion of the prevent invention flows into an oil-containing earth formation, it displaces oil and reduces the oil saturation of the zone into which it is injected. Both actions aid in increasing the effective permeability to water. Thus, the present process is advantageous for use in improving the water injectivity properties of both water-sensitive and nonwater-sensitive earth formations. Improving the preferential permeability to water may also prove to be useful for various other processes.

The components of the emulsion must be adjusted to produce a finely dispersed emulsion which may be readily injected into the formation. Thus, it is preferred that at least 70% and preferably 90% of the dispersed oil droplets not exceed dimensions of 4–5 microns and the balance be less than 10 microns and preferably the dispersed oil droplets should not be larger than 4 microns in order to prevent plugging from occurring. In general, in the preferred emulsions of the present invention, the emulsion components are mixed at a relative high rate of shear, and the relative proportions of the components are adjusted as required so as to provide an emulsion having a filter rate that exceeds about 10 cc. per minute through a 0.45 micron millipore filter paper.

In the present process the continuous saline aqueous phase (brine phase) of the emulsion contains cationic surfactants in a unique situation. For example, where the surfactant anions are substituted ammonium ions: (1) the hydrophobic portions of the anions tend to be concentrated at the boundaries of or within the droplets of the oil solution that are dispersed within the aqueous phase of the emulsion; (2) these droplets are small enough to move within the pores of the earth formation; and, (3) due to the combined effects of the preferentially oil-soluble surfactant that is dissolved in the oil and the cationic surfactant that is dissolved in the water, these droplets have an interfacial tension that is low enough to allow them to deform into an oil film. In this situation it appears that, as the ammonium ion portions of the cationic surfactant tend to move into contact with and be adsorbed on the wall surfaces of the pores of an earth formation, the oil droplets are carried along by the substituted ammonium ions and are spread into a film that covers the solid surfaces of the earth formation. In any event it is clear that the earth formation tends to become oil-wet and any water-swellable clays that are present in the earth formation tend to be prevented from becoming swelled by fresh water that is injected after the emulsion has been injected.

The use of emulsions of the present invention as pretreatment slugs in formations from which oil is to be recovered by water flooding is advantageous in many respects as with respect to economically transporting the oil solution deeply into the earth formation and ensuring the adherence of an oil film on substantially all of the grains, and the use of such emulsions has been found profitable in commercial uses of the invention.

The oil phase of the emulsion comprises up to 40% and preferably from about 1 to about 10% by weight of the emulsion can be any suitable liquid hydrocarbon such as petroleum oils, e.g., diesel oil, aromatic solvents, aromatic hydrocarbons, e.g., benzene, xylene or toluene and mixtures thereof such as toluene-diesel oil mixes.

The oil-soluble surfactants which are dispersed in the oil phase of the emulsion can include oil-soluble surfactants capable of aiding in oil-wetting earth formations and particularly oil-soluble amino nitrogen-containing compounds such as aromatic, aliphatic and/or cycloaliphatic amines, amides, imides, organic or inorganic salts and quaternary ammonium derivatives thereof. Among the amino nitrogen-containing compounds are included aniline, alkyl-substituted aniline, e.g., di-$C_{1-18}$ alkyl aniline, heterocyclic amino compounds, e.g., morpholine, piperidine; miscellaneous amino-compounds e.g., phenyl hydrazine, benzidine; polyalkyl polyamines, e.g., Duomeens made by Armour Chemical Company and includes $C_{8-18}$ alkyl-substituted polyalkyl polyamine or alkoxy derivatives and salts thereof and other materials such as tall oil and the like. The preferentially oil-soluble surfactant can be substantially any relatively polar oil-soluble material that is capable of causing a significant reduction in the interfacial tension, of about 50 dynes per centimeter, that is characteristic of an oil-water interface.

A particularly useful oil-soluble surfactant for emulsions of the present invention is an oil-soluble salt of a N-alkyl-substituted polyamine and a fatty acid or a dimer acid and compounds of this type can be prepared by the methods described in U.S. Patents 2,736,658; 2,798,045 or 3,017,360. Salts of this type are manufactured by Armour Industrial Chemical Company under the name of Redicote 75TXO and can include Duomeen T-mono- and dioleate or Duomeen S-mono- and dioleate, or Duomeen C-mono- and dioleate wherein the Duomeens are fully described in U.S. Patent 2,798,045. The corresponding laurates, stearates and the like can be used as substitutes or in mixtures with oleate salts and preferred is Redicote 75TXO as described. These oil-soluble polyamine salts are particularly compatible with the water-soluble cationic emulsifiers used in the aqueous phase of the emulsions.

The water-soluble cationic surfactants or mixtures of cationic and non-ionic surfactants used in the saline aqueous (brine) phase of the emulsion can be substantially any well-known surfactant of this type, examples of which are described in the Encyclopedia of Chemical Technology, The Interscience Encyclopedia, Inc., vol. 13, pages 515–517 (1954).

Especially desirable water-soluble organic cationic agents for making oil-in-water emulsions of the present invention, and which may be used in conjunction with water-soluble agents include quaternary ammonium halides described in U.S. Patents 2,775,617, 2,933,530, 2,950,318, 3,024,283, 3,073,864 and 3,175,008 and are manufactured by Armour Industrial Chemical Company under the name of Redicote E11. Redicote E11 is a chloride of quaternary ammonium compound which is normally available as a solution in isopropyl alcohol (Redicote E12L) for ease of handling and dissolving it and emulsifying it in an oil mixture and water. One well-known process of preparing quaternary ammonium compounds which is in rather widespread industrial use involves the alkylation of alkyl secondary amines with alkyl halides to produce tetraalkyl ammonium halides. In general, this process can be represented by the following equation

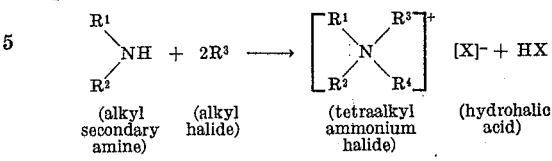

wherein $R^1$ has a carbon chain of from 8 to 20 and where the other R's are hydrogen and/or $C_{1-4}$ alkyl groups.

In conjunction with the above-water-soluble cationic emulsifier may be used non-ionic agents such as are sold by Armour Industrial Chemical Company under the tradename Redicote E12. Such products are made by reacting an alkylphenol, such as octyl or nonyl phenol with from 2 to 16, preferably from 3 to 12, moles of alkylene oxide such as ethylene and/or propylene oxides, preferably the ethylene oxides, to yield a preferentially water-soluble alkyl phenoxy polyalkylene glycol having the formula

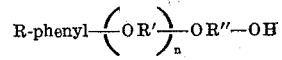

wherein $n$ is an integer of from 2 to 16, preferably from 3 to 12, R is an alkyl radical of from 4 to 20 carbon atoms, preferably 4 to 16, and R' and R'' are the same or different alkylene groups such as ethylene or propylene groups. If desired, small amounts of amines, e.g., aliphatic amines or aromatic amines (aniline), may be added as an auxiliary emulsifier. Thus, the aqueous phase of the emulsion may also include a minor portion, say 0.5 to 3.0% of an aliphatic amine having from 1 to 12 carbon atoms and preferably from 3 to 8, such as butyl or dipropylamine, or an aromatic amine such as aniline, alkyl aniline, diphenylamine, discresylamine or dinaphthylamine. When aniline or other aromatic amines are used in emulsions of this invention, they appear to essentially act as auxiliary oil-wetting agents.

The aqueous phase of the emulsion may if desired contain a small amount of an inert salt such as an alkali metal and/or alkaline earth metal halide, sulfate, phosphate, carbonate such as sodium chloride and/or calcium chloride where clay formation is encountered so as to prevent the clay from being dispersed while the emulsion is being injected into the earth formation. When no clay is present the aqueous phase need not contain a salt. In other words the salinity of the aqueous phase of the emulsion is generally governed by the type of formation involved and if it is clayey the aqueous phase should contain an inert salt in an amount of not less than approximately 0.5% and preferably between about 0.5% and about 5%.

The following oil coating emulsions useful as pretreatment slugs in rendering formations permeable to water flooding during recovery of oil illustrate the invention. The emulsions were prepared by dissolving the oil-soluble surfactant in oil and the water-soluble additives in brine and homogenizing the two solutions for about 2–10 minutes in a homogenizer such as an Eppenbach homogenizer.

(I)

| | |
|---|---|
| Diesel oil, percent vol. | 5 |
| Redicote 75TXO (oil-soluble cationic surfactant), percent vol. | 0.4 |
| Redicote E11 (water-soluble cationic quaternary ammonium chloride), percent vol. | 0.5 |
| $CaCl_2$, percent wt. | 2 |
| Brine | Bal. |

(II)

| | |
|---|---|
| Diesel oil, percent vol. | 5 |
| Aniline, percent vol. | 0.5 |
| Redicote 75TXO, percent vol. | 0.2 |
| Redicote E11, percent vol. | 0.25 |
| $NaCl_2$, percent wt. | 3 |
| Brine | Bal. |

(III)

| | |
|---|---|
| Diesel oil, percent vol. | 5 |
| Redicote 75TXO, percent vol. | 0.4 |
| Redicote E11, percent vol. | 0.5 |
| Redicote E12L, percent vol. | 0.05 |
| $CaCl_2$, percent wt. | 2 |
| Brine | Bal. |

(IV)

| | |
|---|---|
| Diesel oil, percent vol. | 1 |
| Redicote 75TXO, percent vol. | 0.08 |
| Redicote E11, percent vol. | 0.1 |
| Redicote E12L, percent vol. | 0.1 |
| $CaCl_2$, percent wt. | 2 |
| Brine | Bal. |

The superiority of the process of the present invention is illustrated by the following tests and the results are shown in Tables I, II and III.

with $k_{w_2}$ indicated the effect of the treatment on the clays and comparing $k_{w_2}$ with $k_{w_1}$ showed such effects as changes in oil saturation, changes in wettability, or blockage by the emulsion. In the tests shown in Tables I, II and III, $k_{w_1}$, $k_{w_2}$ and $k_{w_3}$ were always measured at the same pressure and temperature.

At the conclusion of some of the tests, the core was cut into sections and the permeability of each section determined in order to evaluate the homogeneity of the treatment with respect to distance from the injection face. In other tests the amount of oil remaining in the core was determined by Dean and Stark distillation.

The tests were made on two quarry rocks, Berea and Ohio sandstone, both very water-sensitive, and on plugs cut from various subsurface cores. In all cases the cores were mounted in Hassler-type holders.

TABLE I

| Expt. No. | Oil Coating Emulsions | Cc. Injected | Permeabilities (md.) $k_{w1}$ | Permeabilities (md.) $k_{w3}$ | $k_{w3}/k_{w1}$ (percent) | Permeability Profile* (md.) 1 | 2 | 3 | 4 | 5 |
|---|---|---|---|---|---|---|---|---|---|---|
| 1 | Example I | 10 | 35 | 1.0 | 2.9 | 52 | 31 | 26 | 10 | 0.8 |
| 2 | As in Expt. 1 | 17 | 39 | 32 | 82 | 42 | 37 | 29 | 34 | 19 |
| 3 | As in Expt. 1 | 25 | 41 | 36 | 90 | 35 | 41 | 38 | 43 | 30 |
| 4 | Example II | 10 | 39 | 0.5 | 1.3 | 32 | 21 | 17 | 3 | 0.5 |
| 5 | As in Expt. 4 | 25 | 34 | 34 | 100 | 42 | 53 | 30 | 45 | 21 |
| 6 | No treatment | 0 | 49 | 0.11 | 0.28 | 1.3 | 1.4 | 1.7 | 1.4 | 2.2 |

* Approximately 1 cm. in sections in order of distance from the injection face.
$k_{w1}$ = permeability to 3% NaCl before treatment.
$k_{w3}$ = permeability to fresh water after water flood.
Berea Sandstone Cores: 2.54 cm. dia.; 6.5 cm. long; pore volume, ~6 cc.

Flood procedures

The essential features of the tests were to determine the permeability of a water-sensitive core to brine and prolonged fresh water flooding to change in permeability. The fresh water was injected for periods up to four days, usually for 16 hours, and at temperatures up to 200° F., usually 180° F. Tests were made on single phase systems (i.e., the test core contained brine only) and on two phase systems in which the core contained brine and residual oil.

In some tests a short (1 hour) flood with brine was made immediately after the treatment and before the fresh water flood. The results of the tests were then interpreted by the relationship between three permeabilities:

(1) $k_{w_1}$ the permeability to brine, either absolute or effective at $S_{or}$, as the case might be, immediately before the treatment.

(2) $k_{w_2}$ the permeability to brine at the end of the brine flood after the treatment.

(3) $k_{w_3}$ the permeability to fresh water at the end of fresh water flood.

The ratio $k_{w_3}$ to $k_{w_1}$ showed the overall effect of the treatment and was the essential criterion. Comparing $k_{w_3}$ In Table I it is shown that the efficacy of the oil coating emulsions increased as the amount injected was increased. When low volumes were injected the clays were inactivated only in the front part of the core (not permeability profiles in experiments 1 and 4). When the amount was increased the protection extended along the full length of the core (experiments 3 and 5). The optimum quantity for the Berea sandstone cores appears to be 25 cc. or 4 pore volumes. In line with this, unexpended emulsion was first discharged from the core after about 20 cc. had been injected. When the oil coating emulsions were injected in sufficient amount, the permeability to fresh water was the same as the permeability to brine indicating complete inactivation of the clays.

TABLE II

| Expt. No. | Formulation | Cc. Injected | Permeabilities (md.) $k_w$ | $k_{w1}$ | $k_{w2}$ | $k_{w3}$ | $k_{w3}/k_{w1}$ (percent) | Terminal Oil Saturation (Percent) | Permeability Profile (md.) 1 | 2 | 3 | 4 | 5 |
|---|---|---|---|---|---|---|---|---|---|---|---|---|---|
| | Berea Sandstone Cores:* | | | | | | | | | | | | |
| 1 | No treatment | 0 | 48 | 8.1 | | .06 | 0.6 | 51 | | | | | |
| 2 | do | 0 | 38 | 6.2 | | .09 | 1.2 | 37 | | | | | |
| | Oil Coating Emulsions: | | | | | | | | | | | | |
| 3 | Example I | 15 | 35 | 7.9 | 13 | 18 | 230 | 20 | | | | | |
| 4 | Example II | 25 | 36 | 7.6 | 22 | 25 | 330 | | 54 | 44 | 28 | 21 | 13 |
| 5 | Example III | 15 | 32 | 6.6 | 13.5 | 17.3 | 260 | 17.2 | | | | | |
| 6 | Same as Expt. 5 | 15 | 23 | 7.0 | 9.6 | 10.3 | 147 | | 17 | 9 | 14 | 13 | 11 |
| 7 | do | 25 | 43 | 7.6 | 20 | 21 | 290 | | 46 | 36 | 35 | 17 | 9 |
| 8 | do | 25 | 29 | 3.6 | 22 | 23.6 | 650 | 18.8 | | | | | |
| 9 | do | 50 | 35 | 2.0 | 28 | 30.2 | 1,500 | | 41 | 57 | 25 | 30 | 8 |
| 10 | Example IV | 25 | 29 | 4.5 | 5.2 | 10.5 | 201 | | 23 | 23 | 14 | 16 | 17 |
| 11 | Same as Expt. 10 | 50 | 29 | 5.7 | 9.5 | 11.1 | 191 | | 42 | 23 | 17 | 11 | 6 |
| 12 | do | 90 | 31 | 5.8 | 17.0 | 17.5 | 301 | 12.2 | | | | | |
| 13 | Example II | 25 | 41 | 8.3 | 19 | 18 | 220 | | 59 | 33 | 40 | 19 | 6 |
| 14 | No Treatment | | 1.0 | 0.025 | | 0.006 | 24 | 49 | | | | | |

*6.5 cm. long, 2.54 cm. dia., pore vol.,~6 cc.
$k_w$ = Permeability to 3% NaCl (single phase).
$k_{w1}$ = effective permeability to 3% NaCl at residual oil before treatment.
$k_{w2}$ = effective permeability to 3% NaCl at residual oil after treatment.
$k_{w3}$ = effective premeability to tap water at residual oil after treatment.

In Table II it is noted that the emulsion treatment caused a marked increase in the effective permeability to water and in all cases $k_{w2}$ and $k_{w3}$ were considerably percent to 18 percent and another reason is that the oil bility was the decrease in oil saturation from about 40 percent to 18 percent and another reason is that the oil coating emulsion changed the grain surfaces from water-wet to neutral.

TABLE III

| Expt. No. | Well | Formulation | Pore Volumes Injected | Permeabilities (md.) $k_{w1}$ | $k_{w2}$ | $k_{w3}$ | $k_{w3}/k_{w1}$ (percent) | Oil Saturation (percent) |
|---|---|---|---|---|---|---|---|---|
| | Single Phase Cores (Not Preserved): | | | | | | | |
| 1 | Lookout 9, California—5391' | None | 0 | 0.75 | | 0.04 | 5 | |
| 2 | do | Example II | 6 | 0.55 | 0.2 | 0.31 | 55 | |
| 3 | Big Foot 83, Texas—3264' | None | 0 | 0.05 | | 0.003 | 6 | |
| 4 | do | As in Expt. No. 2 | 4 | 0.4 | 0.12 | 0.12 | 28 | |
| 5 | L₂ Sand Block 27, Delta Div. La | None | 0 | 65 | | 14 | 21 | |
| 6 | do | As in Expt. No. 2 | 7.0 | 35 | 35 | 35 | 160 | |
| | Two Phase Cores (Not Preserved): | | | | | | | |
| 7 | Cap 31, California—5106' | None | 0 | 0.33 | | 0.07 | 21 | |
| 8 | Cap 31, California | As in Expt. No. 2 | 12 | 1.1 | 1.1 | 1.2 | 109 | |
| | Two Phase Cores (Preserved), 4.5 cm. long: | | | | | | | |
| 9 | Taylor 158, California—9287' | None | 0 | 2.3 | | 1.1 | 47 | |
| 10 | Taylor 158, California—9377' | do | 0 | 4.5 | | 2.7 | 60 | |
| 11 | Taylor 158, California—9293' | As in Expt. No. 2 | 5 | 2.4 | 1.4 | 2.3 | 96 | |
| 12 | Taylor 158, California—9291' | Example I | 5 | 3.7 | 4.7 | 9.1 | 245 | |
| 13 | Taylor 158, California—9382' | As in Expt. 12 but all operations at 200° F. | 1 | 71. | | 11.2 | 158 | 9 [15]* |
| 14 | Taylor 158, California—9165' | do | 5 | 1.2 | 2.1 | 2.8 | 230 | 16 [22]* |
| 15 | Taylor 158, California—9383' | do | 5 | 15 | 16 | 23 | 153 | 15 [15]* |
| 16 | Taylor 158, California—9377' | As in Expt. 12 but core extracted before test. | 9 | 2.0 | 0.3 | 0.9 | 45 | 11 [17]* |

*Figures in brackets are oil saturations of virgin core at approximately same depth as the test plug.

The results in Table III show that:
(1) $k_{w3}$ was generally about twice $k_{w1}$ for the treated preserved cores compared to about ½ for the untreated cores.

As shown in Table II the oil saturations of the treated cores at the end of the fresh water floods in the tests were much lower than those of the untreated cores. Further, test results are shown in Table IV where 3 percent NaCl was flooded through treated and untreated cores at the same temperatures and pressures used in the previous tests. Oil saturations were determined by the Dean and Stark distillation at the end of 1-hour and 16-hour floods. The results showed that the prolonged flood at elevated temperature reduced the oil saturation but the oil coating treatment with emulsion compositions of Example III reduced it still further.

TABLE IV

| Expt. No. | Core Treatment | Total Time of Flood (hrs.) | Total cc. of 3% NaCl | Initial $k_w$ (md.) | Terminal $k_w$ (md.) | Terminal $S_{cr}$ (percent) |
|---|---|---|---|---|---|---|
| 1 | None | 1 | 60 | 3 | 3 | 40 |
| 2 | do | 16 | 1,410 | 8 | 9 | 31 |
| 3 | 25 cc. emulsion (Ex. III) | 1 | 230 | 4.4 | 14 | 26 |
| 4 | 25 cc. emulsion (Ex. II) | 16 | 2,040 | 7 | 17 | 17 |

From Tables I through IV it can be clearly seen that by pretreating formations prior to water flooding with emulsions (Example III) as described effectively increases the oil-wetness, lowers the oil saturation and inactivates the formations relative to water-swelling. This increases the permeability to water of thus treated formations and results in increased oil recovery when the thus treated formations are subjected to water flooding regardless whether the injected water is fresh water or brine.

I claim as my invention:
1. An improved waterflooding process for recovery of hydrocarbons from underground formations by oil-wetting the formation thereby preventing swelling and improve its permeability comprising:
   (1) injecting into the formation through an injection well an oil-in-water emulsion, the oil droplets in the emulsion being less than 4 microns, the oil phase being less than 40% of the total emulsion and the balance being water and the oil phase containing an oil-soluble amino-nitrogen-containing surfactant and the water phase containing at least one water-soluble surfactant selected from the group consisting of a water-soluble cationic surfactant and a mixture of a water-soluble cationic surfactant and a nonionic surfactant;
   (2) maintaining the emulsion in the formation for a time sufficient to oil-wet the grain particles with which the emulsion is in contact; and,
   (3) injecting into the well water under flooding conditions to force the hydrocarbons into the well from which hydrocarbons are recovered.

2. A process of claim 1 wherein the water phase of the emulsion contains from 0.5% to 5% of an inert salt and the dispersed oil droplet size is generally less than 4 microns and the injected emulsion and water flooding is introduced into the formation through an injection well and the hydrocarbons are recovered from said formation through a production well.

3. A process of claim 1 wherein the water used in forming the oil-in-water emulsion is brine containing at least 1.5% of an inorganic salt; the oil droplet size is less than 4 microns; the oil-soluble cationic surfactant is a polyamine salt of a fatty acid and the cationic water-soluble surfactant is a water-soluble quaternary ammonium compound.

4. A process of claim 3 wherein the oil-in-water emulsion components are mixed at a relatively high rate of shear to provide a fluid capable of flowing through a 0.45 micron millipore filter paper at at least 10 cc. per minute.

5. A process of claim 3 wherein the oil used in forming the emulsion is a petroleum oil, the water is brine containing from 1.5 to 3% of a salt selected from the group consisting of sodium chloride and calcium chloride, the oil-soluble surfactant is a polyamine salt of a long chain fatty acid and the water-soluble surfactant is a mixture of a quaternary ammonium chloride cationic surfactant and an alkyl phenol-ethylene oxide reaction product.

6. A process of claim 5 wherein the emulsion components are mixed at a relatively high rate of shear to provide a fluid capable of flowing through a 0.45 micron millipore filter paper at at least 10 cc. per minute.

References Cited

UNITED STATES PATENTS 3,123,135  3/1964  Bernard et al. _____ 166—9
3,208,517  9/1965  Binder et al. _____ 166—9
3,288,213  11/1966  King et al. _____ 166—9
3,326,287  6/1967  Corrin _____ 166—9

STEPHEN J. NOVOSAD, *Primary Examiner.*

U.S. Cl. X.R.

166—42, 40, 11